UNITED STATES PATENT OFFICE.

MARIA M. RAUB, OF BROOKLYN, NEW YORK.

COMPOSITION FOR CHEWING-GUM.

1,136,613.  Specification of Letters Patent.  Patented Apr. 20, 1915.

No Drawing.  Application filed December 31, 1913.  Serial No. 809,783.

*To all whom it may concern:*

Be it known that I, MARIA M. RAUB, a citizen of the United States, residing at Brooklyn, in the county of Kings and State of New York, have invented certain new and useful Improvements in Compositions for Chewing-Gum, of which the following is a specification.

This invention relates to an improved chewing gum composition, and its object is to provide a composition possessing palatable qualities rendering it pleasant and agreeable as a chewing gum and also having certain medicinal properties to act beneficially in healing the throat, bronchial tubes and lungs.

A further object of the invention is to provide a composition of sufficient firmness to require sufficient effort in chewing to develop the chewing muscles.

The improved composition consists of the following named ingredients combined and compounded in the proportions specified, and in the manner hereinafter set forth:

Pure clean chicle _____ 1 part.
Sugar _____ 3 parts.
Pine tar _____ ⅙ part.
Oil of peppermint in sufficient quantity to impart a pleasant flavor to the product.

The chicle is melted in a jacket kettle and the tar added. The sugar is added gradually and the whole heated to the consistency of molasses, being stirred with a mixer. Pine tar contains some constituents of which the oil of tar is one of the ingredients, which ingredient alone might be relied on.

After the required slight cooling, the mass is kneaded until it is sufficiently hard and pliable to form into pellets of desired size, the cutting of the mass and the formation of the pellets being accomplished by any preferred implements or apparatus.

The product is a chewing gum having the properties of pine tar and provides an antiseptic chewing gum which tends to preserve the teeth, harden the gums and remedy receding gums.

It will be understood that the proportions above specified may be slightly varied if desired.

Having fully described my invention what I claim and desire to secure by Letters Patent is:—

The herein described composition of matter consisting of chicle, sugar, pine tar and a flavoring ingredient admixed in substantially the proportions of one part of chicle, three parts of sugar, and one sixth of one part of pine tar with any desired quantity of flavoring ingredient.

In testimony whereof I affix my signature in presence of two witnesses.

MARIA M. RAUB.

Witnesses:
JOHN F. CORRIGAN,
JAMES L. MADIGAN.